Oct. 20, 1970  R. E. MARSH  3,534,856
VALVE ASSEMBLY AND SELF-CLEANSING BRINE WELL SCREEN
Filed Jan. 25, 1968
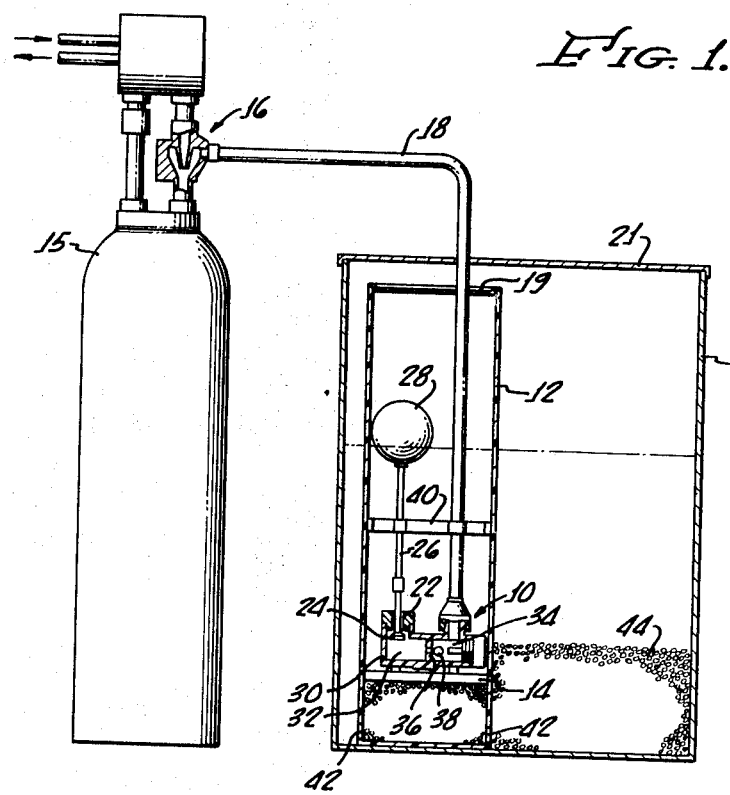
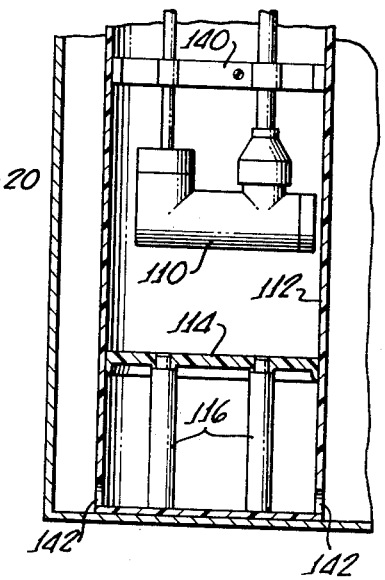
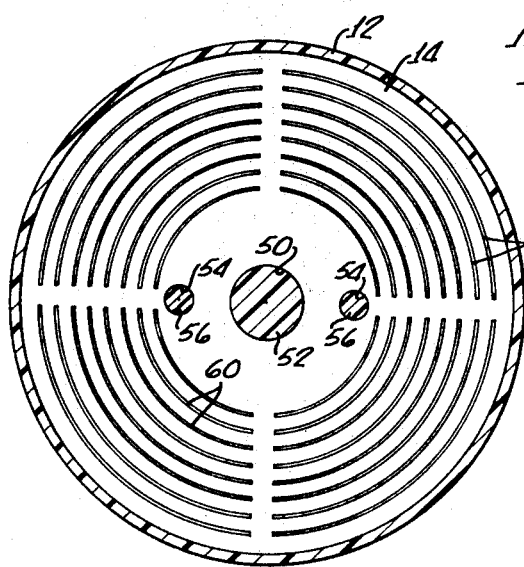
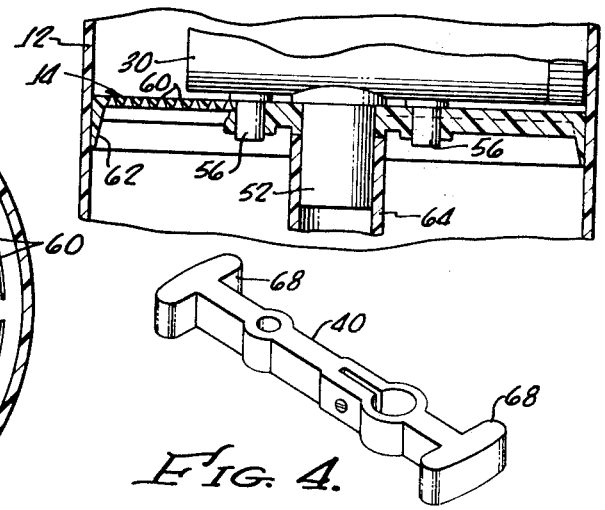
INVENTOR.
ROBERT E. MARSH
BY
FOWLER, KNOBBE
& MARTENS
ATTORNEYS.

United States Patent Office 3,534,856
Patented Oct. 20, 1970

3,534,856
VALVE ASSEMBLY AND SELF-CLEANSING BRINE WELL SCREEN
Robert E. Marsh, Los Alamitos, Calif.
(1707 N. Prospect, Apt. 13A, Milwaukee, Wis. 53200)
Filed Jan. 25, 1968, Ser. No. 700,530
Int. Cl. B01j 23/24
U.S. Cl. 210—126      8 Claims

ABSTRACT OF THE DISCLOSURE

A water conditioner brine supply assembly and screening member for the valve thereof. The assembly includes a brine tank, a cylindrical, ported, brine well mounted in the tank, and a valve mounted within the well by a support which screens solid particles from liquids passing from the tank into the well and into the valve. The screening member is a plastic disc of substantially the same diameter as the internal diameter of the well. The disc carries a plurality of screening openings therein and has an annular depending skirt about the outer circumference thereof.

BACKGROUND OF INVENTION

Water softeners conventionally use an ion exchange resin conditioning media for removing the calcium and magnesium ions from hard water by exchanging these ions for sodium ions. These resins must periodically be regenerated. This involves passing a regenerating ion or sodium ion containing solution such as brine through the conditioning media. Commonly this is accomplished by the use of a separate brine tank which is connected to the conditioner through a valve assembly. The brine tank for the type systems for which this invention is applicable is partially filled with a solid salt such as rock salt which forms a brine solution with water. The brine solution is periodically automatically pumped through the valve assembly, as by means of a venturi in the conditioner, into the water conditioning media. The tank is then refilled to a predetermined level with fresh water through the valve assembly so that a new brine solution is formed by dissolving some of the salt. A supply of salt must be maintained in the brine tank for converting the fresh water to brine for use in each successive regeneration cycle.

The brine tank contains a brine well or tube therein which encases the brine valve assembly. The valve assembly is liquid level actuated and permits flow of the brine solution out of the brine well and tank during the regeneration cycle and permits entry of fresh water into the tank during the brine tank refill cycle. The brine solution flows into the brine well through orifices located near the lower portion thereof.

One problem which has been common in the operation of these brine supply systems is that salt contaminant solid particles and other foreign particles pass from the brine tank into the brine well and lodge themselves between the valve head and valve seat of the brine valve so that it cannot close. Usually it is necessary to have an appliance serviceman disassemble the brine tank, the brine well and the valve to correct this problem.

Many attempts have been made to eliminate the source of this clogging or blocking of the brine valve. For example, screens have been mounted around the apertures at the lower portion of the brine tube so that the particles are filtered out of the brine solution before it reaches the brine valve. These screens, however, soon become clogged since they are located at the point of highest flow rate between the brine tank and the brine valve and thus quickly accumulate many of the partially dissolved particles and other solids from the brine tank. These screens are subject to a high degree of corrosion in the brine solution and are often corroded so badly that portions of the screen break away and block the valve. After the screens become corroded or blocked with accumulated solids, the entire brine well must be removed from the brine tank and the valve disassembled for cleaning.

Another attempt to solve this problem has been to provide a bed of gravel at the lower portion of the brine tank surrounding the orifices in the brine well. The rock salt which is to be dissolved is then placed on top of the gravel bed so that the gravel can filter out the partially dissolved particles of salt and undissolved contaminants before they reach the brine well. While this has been somewhat effective, it reduces the capacity of the brine tank and increases the weight thereof. Additionally many times chips or fragments of the gravel are worn loose by passage of the brine solution therethrough and carried into the brine tube so that they become lodged in the valve seat and cause malfunction of the brine valve.

In view of these problems with prior art devices there is a need for a brine valve assembly which includes means for preventing foreign matter such as contaminant materials from dirty salt or gravel particles from lodging in the valve seat and causing a malfunction of the valve.

Often it is necessary to adjust the height of the brine valve assembly within the brine tube to compensate for the type of salt which is being used. For example, some salt contains a high quantity of insoluble contaminant materials and best results are obtained if the brine valve assembly is spaced from the bottom of the brine tube so that these materials can fall back to the bottom of the tube without being carried into the valve. Thus the brine valve assembly must be readily vertically adjustable within the brine well and should be easily removable therefrom for periodic manual cleansing and inspection.

The brine valve assembly must also be mounted within the brine well so that it will not move from side to side and will always be in proper alignment with the valve head actuating stem and the liquid level float. If the float is out of alignment, the valve stem may become twisted within the valve and block movement of the valve head.

SUMMARY OF THE INVENTION

This invention is directed to a regeneration liquid supply assembly for water conditions. The assembly includes a regeneration tank which contains solid particles of a water soluble, water conditioner regeneration material such as a rock salt. A well or cylindrical tube is mounted within the regeneration tank and communicates with the tank through a port in the well so that liquids can flow between the tank and the well. A valve comprising a valve seat and a liquid level actuated valve head is adjustably mounted in the well. The valve is in fluid communication with the well and alternatively with the water conditioner during the water conditioner regeneration cycle and with a source of fresh water during the regeneration tank refill cycle. The valve assembly is mounted in the well by means which prevent solid particles of greater than a predetermined size from passing into contact with the valve.

The valve head of the assembly is preferably connected by a valve stem to a liquid level sensor or float member which closes the valve when the liquid level in the well reaches a predetermined point. The valve stem is kept in proper alignment with the valve seat by means of an alignment member which is press-fitted between the float and the valve in the well.

The valve is preferably mounted in the well by a friction mounted disc member which is provided with a plurality of radially spaced, circumferentially extending openings therein. The openings have a predetermined radial width for screening solid particles of greater size from passing therethrough. The disc is also provided with a circumferentially extending depending skirt about the outer edge thereof for press-fitting the disc within the well.

To provide the most effective screening of solids, the disc is preferably mounted intermediate the communication ports between the tank and the well and the valve inlet so that liquids passing from the tank into the well and then into the valve must pass through the screening disc. Solid particles greater than the size of the disc openings are thus blocked or entrapped by the lower surface of the disc. During the regeneration tank refill cycle of the conditioner, fresh water passing downwardly through the screening disc washes the entrapped particles from its surfaces.

This invention is further directed to the support member or screening disc for maintaining the valve assembly within a brine well. The support member includes a circular planar disc portion with means defining a plurality of spaced openings in the disc portion. An annular skirt is connected to the outer circumference of the disc portion and depends therefrom for providing a radially flexible surface for frictionally engaging the well. The disc portion is also provided with means for receiving a valve assembly and maintaining the valve assembly in fixed position on the support member in the brine well.

A basic feature of the assembly and support member of this invention is that solid particles are prevented from passing through the support and lodging between the valve seat and valve head of a brine valve and then are washed from the support member so that it is not clogged due to this screening effect.

BRIEF DESCRIPTION OF THE DRAWINGS

The novel features and advantages of this invention will become more readily apparent from a consideration of the appended claims and detailed description when taken in conjunction with the accompanying drawings wherein:

FIG. 1 is a side view partially in section of a water conditioner system including the brine valve assembly and self-cleansing support screen of this invention;

FIG. 2 is a plan view of the self-cleansing valve assembly support screen of this invention;

FIG. 3 is an enlarged sectional view of the support screen of this invention shown with the valve assembly mounted thereon;

FIG. 4 is an oblique view of the valve stem and liquid conduit spacer member of the valve assembly; and FIG. 5 is a partial cross-sectional view through a brine tank and brine well showing another embodiment of the screen of this invention.

DETAILED DESCRIPTION AND PREFERRED EMBODIMENTS

Referring now to the drawings, FIG. 1 shows the brine valve assembly 10 of this invention mounted in a brine well or tube 12 by means of an annular support screen 14 and connected to a water conditioner 15 through a water cycle control module 16 and an appropriate conduit 18. The brine well 12 is mounted within a brine tank 20 which is shown with liquid therein. Both the brine well 12 and the brine tank 20 are provided with removable covers 19 and 31, respectively, with aligned apertures therein for passing conduit 18.

The brine valve assembly 10 comprises basically a resilient valve seat 22 and a resilient valve head 24 which is mounted at one end of a valve stem 26. The other end of the valve stem extends vertically in the brine wall 12 and is attached to a hollow float member 28 as shown. A valve housing 30 defines a valve chamber 32 which communicates with the interior of the brine well through the valve seat 22. The valve head extends into the chamber 32 as shown. The housing 30 also defines an air check chamber 34 which communicates with the valve chamber through an apertured central wall 36 and has a resilient check ball 38 therein.

The valve stem 26 extends through an opening in an alignment bracket 40. The bracket 40 also has a larger opening which receives and passes the conduit 18 (see FIG. 4).

The brine well communicates with the brine tank through a plurality of circumferentially spaced ports 42 near the lower portion thereof. A rock salt 44 or other solid type of salt is placed in the brine tank as shown and the brine solution with partially dissolved solids enters into the brine tube through the circumferentially spaced ports 42.

The entire valve assembly 10 is mounted on the annular screen or disc 14 which is of substantially the same diameter as the inner diameter of the brine well. The screen 14 as shown in FIGS. 2 and 3 is provided with means for mounting the brine valve assembly thereon which comprise a large diameter central opening 50 for receiving a depending enlarged stud 52 on the lower portion of the brine valve assembly housing and a pair of radially spaced smaller diameter annular openings 54 which receive the smaller depending studs 56 as shown in FIG. 3. The studs are permanently affixed in the openings as by chemically bonding or welding them so that the valve housing is rigidly mounted on the screen.

The brine valve screen 14 is also provided with a plurality of circumferentially extending, radially spaced openings or slots 60 as shown in FIG. 2. The slots may be arranged as shown into four quadrants to accommodate support and reinforcing webs located on the underside of each dividing line bewteen the quadrants.

As shown in FIG. 3, the radial width of each of the slots 60 decreases from its lower edge to the upper edge. Solid particles may become lodged in the slots but only the smallest of them are permitted to pass through the slots 60 into the upper portion of the brine well. The annular screen 14 is also provided with a depending circumferentially extending skirt 62 which provides an inwardly flexible surface area for engaging the inner wall of the brine well and supporting the valve assembly in upright position. The screen 14 may be constructed of any resilient plastic which is sufficiently resistant to attack by the brine solution. The acrylonitrile-butadiene-styrene resins have been found to be excellent.

The support screen 14 maintains the valve assembly in radially spaced relation with the side wall of the brine well 12 and in vertically spaced relation with the ports 42 in the lower portion of the brine well. A cylindrical spacer tube 64 as shown in FIG. 3 may be mounted over the central stud 52 of the valve assembly in contact with the bottom edge of the central aperture of the support screen to provide means for spacing the valve assembly a predetermined distance above the bottom of the brine well. In this case, the assembly is inserted downwardly until the cylindrical tube 64 rests on the bottom of the brine well. By varying the length of the cylindrical tube 64 mounted on the stud 52, the distance that the brine valve assembly is located above the lower level of the brine well can be accurately controlled.

The support and alignment bracket 40, shown in FIG. 4, has a dual function of maintaining the valve stem 26 and float 28 in proper alignment with the valve seat 22 and providing a rugged gripping member for removing the entire valve assembly 10 from the brine well. As shown in FIG. 4, the bracket 40 is provided with enlarged end portions 68 each of which has an outer surface with a radius of curvature substantially equal to that of the inner wall of the brine well. The larger through-aperture in the support and alignment bracket 40 is provided with a radially extending slot for providing the flexibility necessary to pass the conduit 18 which extends from the brine valve assembly into the water conditioner control module 16. A set screw may be used to tighten the bracket or the conduit.

The removable covers of the brine well 12 and the brine tank 20 contain aligned apertures therein as shown in FIG. 1 for passing the conduit therethrough and into connection with the control module 16.

The control module 16 may be any conventional control which alternatively connects the conduit 18 to the water softener during the regeneration cycle and to a fresh water line during the brine tank refill cycle. When the module is set for the regeneration cycle, fresh water flows downwardly past a venturi in the module near the connection with the conduit 18 as shown. This draws brine solution through conduit 18 from the chambers 34 and 32 causing the valve head 24 to move away from the valve seat 22 so that the brine solution can be drawn out of the well and tank. This in turn causes solid particles in the well 12 and tank 20 to be drawn up toward the valve assembly. The support screen 14, however, permits only the smallest particles and the liquid to pass above the lower end of the valve assembly so that no particles large enough to lodge between the valve head and valve seat pass into the upper portion of the brine tube. The heavier particles are prevented by gravity from even moving into contact with the screen. When the brining cycle has been completed fresh water is directed through control module 16, the conduit 18 and the valve assembly 10 into the brine well 12 and downwardly through the screen 14 dislodging many of the trapped particles therefrom and causing them to flow downwardly into the bottom portion of the brine well and some of them through the ports into the brine tank. This agitation of the particles assists in dissolving the salt and supplements the self-cleansing of the support screen. Thus, the downwardly flowing fresh water and the force of gravity make the screen substantially self-cleansing.

In the event the screen should become clogged, however, so that it is necessary to manually clean it, this is easily accomplished by removing the covers from the brine tank and the brine well and removing the entire valve assembly by gripping the support and alignment bracket 40 and pulling upwardly. If the conduit 18 is flexible it may not be necessary to disconnect it from the water cycle control module 16 in order to remove the valve assembly and screen, whereas, if the conduit is rigid such disconnection will be necessary. The screen can then be easily cleaned manually and returned to the brine tank for further use. It is not necessary in this manual cleaning to remove the entire brine well or to take the tank away from the conditioner. Any portion of the valve assembly can be replaced or repaired by removing the assembly in the same manner.

The self-cleansing screen of this invention, as shown in FIG. 5, can also be used independently of the valve assembly. In this embodiment of the self-cleansing screen, the screen 114 may be press-fit in the brine well 112 or otherwise supported therein intermediate the brine well inlets 142 and the valve assembly 110. For example the screen 114 may be supported by a pair of depending support rods 116 which are adapted to space the screen by a desired distance from the lower end of the brine tank. The screen 114 is identical to screen 14 with respect to the screening openings therein but the other openings, as shown in FIG. 2, for mounting the brine valve assembly are eliminated. The brine valve 110 which is used with this embodiment of the screen need not be modified in any manner to cooperate with the screen and may be independently supported in the brine tank as by the bracket 140 or may rest on the screen for total support or partial support.

What is claimed and desired to be secured by Letters Patent is:

1. A regeneration liquid supply assembly for a water conditioner comprising:
   a regeneration tank for containing solid particles of water-soluble, water conditioner regeneration material;
   a well mounted within said tank and communicating with said tank through an opening in said well;
   a valve mounted in said well and comprising:
      a valve seat;
      means providing fluid communication between said valve seat and said well, and, alternatively, between said valve seat and said water conditioner during a water conditioner regeneration cycle and between said well and a source of fresh water during a tank refill cycle;
      a valve head mounted for movement into sealing relation with said valve seat; and
      a disc having a plurality of radially spaced, circumferentially extending openings therein of a predetermined radial width mounted in said well and extending transversely thereof above said opening in said well and below said valve for preventing solid particles of greater than a predetermined size from passing into contact with said valve.

2. A water conditioner assembly as defined in claim 1 wherein said valve head is connected through a valve stem to a liquid level sensor from moving said valve head into sealing engagement with said valve seat when the liquid level in said well reaches a predetermined level, said valve head being adapted to be moved out of contact with said valve seat during said regeneration cycle and further including alignment means for said valve stem to maintain the valve head in proper alignment with said valve seat, said alignment means comprising an elongated central member and a pair of enlarged end members having the opposite end surfaces thereof spaced apart from each other a distance substantially equal to the internal diameter of said brine well and having said end surface conformed to a radius of curvature substantially equal to that of the inner wall of said well to effect contact of said end surfaces with diametrically opposed areas of the inner wall of said well.

3. An assembly as defined in claim 1 wherein said valve is conected to said conditioner so as to be in an open position during the conditioner regeneration cycle and during the tank refill cycle, so that liquid containing dissolved regenerating material flows from said well and said tank into said conditioner during the regeneration cycle and fresh water flows through said valve into said well and tank during said refill cycle and wherein said disc mounted transversely of said well is positioned in said well so that it prevents solid materials from passing into said valve during said conditioner regeneration cycle and so that solid materials lodged in said mounting means are rinsed therefrom during said tank refill cycle.

4. A regeneration liquid supply assembly for a water conditioner comprising:
   a regeneration tank for containing solid particles of water-soluble, water conditioner regeneration material;
   a well mounted within said tank and communicating with said tank through an opening in said well;
   a valve mounted in said well and comprising:
      a valve seat;
      means providing fluid communication between said valve seat and said well, and, alternatively, between said valve seat and said water conditioner during said well and a source of fresh water during a tank refill cycle;
a valve head mounted for movement into sealing relation with said valve seat; and
means for mounting said valve in said well and for preventing solid particles of greater than a predetermined size from passing into contact with said valve comprising a disc mounted in said well and having a plurality of radially spaced, circumferentially extending openings therein of a predetermined radial width, said disc being vertically adjustable within said well to vary longitudinally of said well the valve supported by the disc.

5. An assembly as defined in claim 4 wherein said disc is of substantially the same diameter as the inside diameter of said well and has locating facilities cooperable with complementary locating facilities of said valve for mounting said valve in spaced relation to the side wall of said well and for mantaining said valve in fixed vertical adjustment in said well.

6. A regeneration liquid supply assembly for a water conditioner comprising:
a regeneration tank for containing solid particles of water-soluble, water conditioner regeneration material;
a well mounted within said tank and communicating with said tank through an opening in said well;
a valve mounted in said well and comprising:
a valve seat;
means providing fluid communication between said valve seat and said well, and, alternatively, between said valve seat and said water conditioner during a water conditioner regeneration cycle and between said well and a source of fresh water during a tank refill cycle:
a valve head mounted for movement into sealing relation with said valve seat; and
means for mounting said valve in said well and for preventing solid particles of greater than a predetermined size from passing into contact with said valve, said means for mounting said valve being located above the opening in said well that provides communication with said tank and mounts said valve on its surface opposite the one facing toward said opening, so that it is interposed between the valve and the opening and liquids passing from said tank through said port into said well must pass through said mounting means before entering said valve.

7. A regeneration liquid supply assembly for a water conditioner comprising:
a regeneration tank for containing solid particles of water-soluble, water conditioner regeneration material;
a well mounted within said tank and communicating with said tank through an opening in said well;
a valve mounted in said well and comprising:
a valve seat;
means providing fluid communication between said valve seat and said well, and, alternatively, between said valve seat and said water conditioner during a water conditioner regeneration cycle and between said well and a source of fresh water during a tank refill cycle;
a valve head mounted for movement into sealing relation with said valve seat; and
means mounted in said well and extending transversely thereof above said opening and below said valve for preventing solid particles of greater than a predetermined size from passing into contact with said valve, and wherein:
said regeneration tank comprises a vessel having an open top and a removable cover therefor, said cover containing a through aperture therein;
said well comprises a substantially cylindrical axially elongated vessel having a plurality of through ports adjacent the lower edge thereof and an open top end, said well including an apertured cover for its open top and being adapted to be situated in one portion of said tank so that the aperture in the cover of said well is substantially in vertical alignment with the aperture in the cover of said tank;
said valve includes a housing defining a valve chamber for mounting said valve seat, said valve head being disposed in said chamber so that said valve head moves into said chamber, and said housing further providing an air check chamber in communication with said valve chamber;
said means for providing fluid communication comprises a conduit extending from said air check chamber through the apertures in the covers of said well and said tank into connection with a water conditioner cycle control mounted on said water conditioner;
said valve head is actuated by a float member connected to said valve head through an elongated valve stem;
said assembly further includes an alignment bracket mounted above said assembly and having a pair of spaced through-apertures therein for passing said conduit and said valve stem therethrough to maintain said conduit and said valve stem substantially in vertical alignment respectively, with said air check chamber and said valve chamber;
said means mounted in said well transversely thereof comprises an annular disc having a plurality of radially spaced, circumferentially extended openings therein for screening solid particles from liquids passing from said tank and from the lower portions of said well into said valve;
said housing having depending attachment members mounted thereon; and
said annular disc having means thereon for receiving said attachment members and mounting said valve assembly in fixed vertical and radial position in said well.

8. A regeneration liquid supply assembly for a water conditioner comprising:
a regeneration tank for containing solid particles of water-soluble, water conditioner regeneration material;
a well mounted within said tank and communicating with said tank through an opening in said well;
a valve mounted in said well and comprising:
a valve seat;
means providing fluid communication between said valve seat and said well, and, alternatively, between said valve seat and said water conditioner during a water conditioner regeneration cycle and between said well and a source of fresh water during a tank refill cycle;
a valve head mounted for movement into sealing relation with said valve seat; and
a disc having a plurality of radially spaced, circumferentially extending openings therein, mounted in said well and extending transversely thereof above said opening and below said valve for preventing solid particles of greater than a predetermined size from passing into contact with said valve, openings in said disc comprising a plurality of slots of upwardly tapering width.

References Cited

UNITED STATES PATENTS

| | | | |
|---|---|---|---|
| 874,418 | 12/1907 | McEvoy | 210—498 X |
| 2,906,285 | 9/1959 | Rosten et al. | |
| 3,040,895 | 6/1962 | Sisk | 210—164 |
| 3,095,005 | 6/1963 | Thompson. | |
| 3,146,788 | 9/1964 | Mahlsted et al. | 210—191 X |
| 3,185,302 | 5/1964 | Kryzer | 210—126 |
| 3,202,174 | 8/1965 | Rudelick | 23—272.6 X |
| 3,227,524 | 1/1966 | White. | |
| 3,374,891 | 3/1968 | Buchmann | 210—126 |
| 3,406,829 | 10/1968 | Bosche | 210—164 |

FOREIGN PATENTS

| | | |
|---|---|---|
| 936,396 | 9/1963 | Great Britain. |

REUBEN FRIEDMAN, Primary Examiner

C. M. DITLOW, Assistant Examiner

U.S. Cl. X.R.

210—191, 498; 23—272.6, 312

PO-1050
(5/69)

UNITED STATES PATENT OFFICE
CERTIFICATE OF CORRECTION

Patent No. 3,534,856  Dated October 20, 1970

Inventor(s) Robert E. Marsh

It is certified that error appears in the above-identified patent and that said Letters Patent are hereby corrected as shown below:

Column 2, line 53, "conditions" should be --conditioners--;
Column 4, line 2, "31" should be --21--;
Column 4, line 7, "wall" should be --well--;
Column 4, line 45, "bewteen" should be --between--;
Column 6, line 36, "from" should be --for--;
Column 7, line 2, after "during" insert --a water conditioner regeneration cycle and between--.

SIGNED AND
SEALED
JAN 19 1971

(SEAL)
Attest:

Edward M. Fletcher, Jr.
Attesting Officer

WILLIAM E. SCHUYLER, JR.
Commissioner of Patents